Aug. 4, 1964    L. L. KENNEDY    3,143,146
LEAKPROOF TELESCOPIC LOADING ARM
Filed Jan. 2, 1962    2 Sheets-Sheet 1
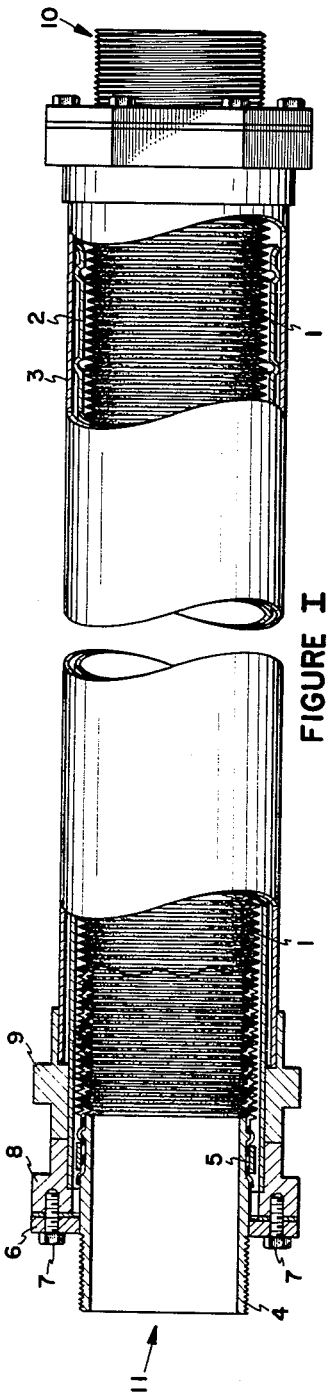
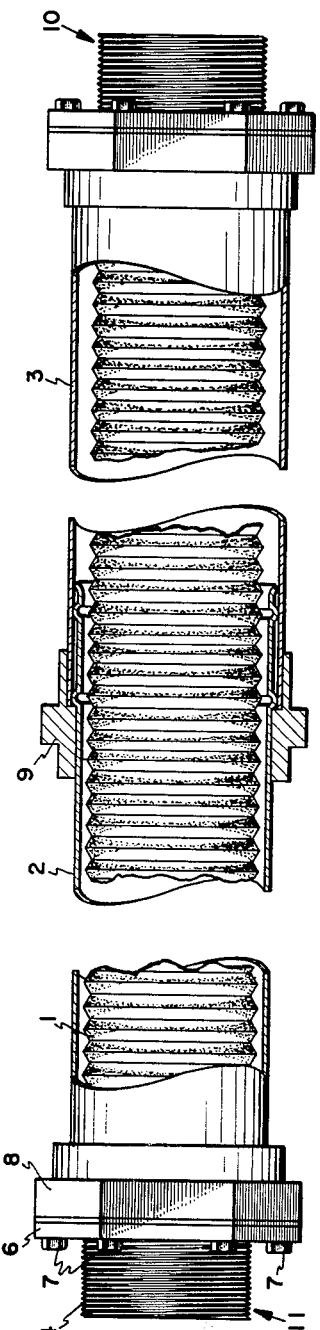
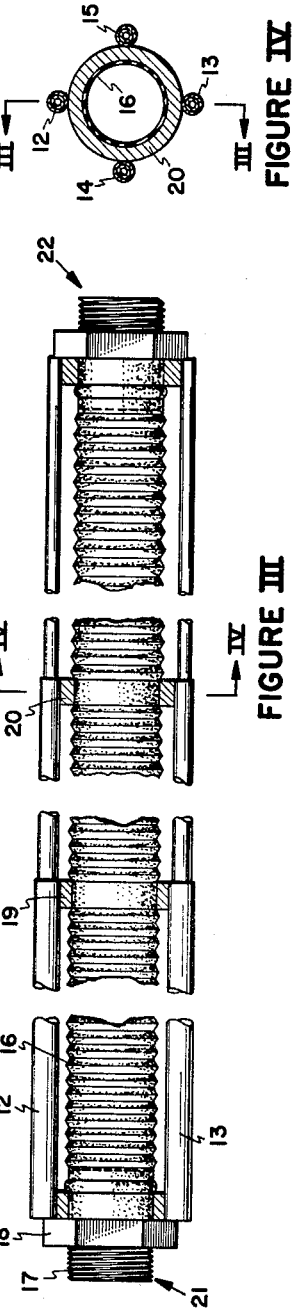
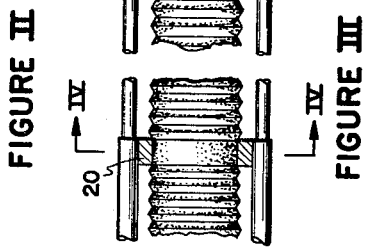
Logan L. Kennedy INVENTOR
BY W. O. Heilman
PATENT ATTORNEY Aug. 4, 1964 L. L. KENNEDY 3,143,146
LEAKPROOF TELESCOPIC LOADING ARM
Filed Jan. 2, 1962 2 Sheets-Sheet 2
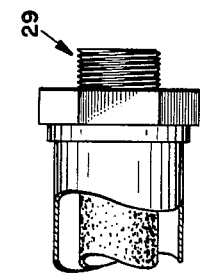
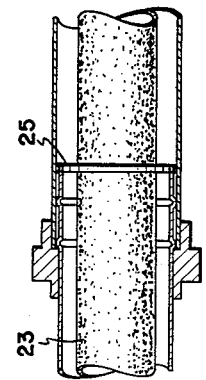
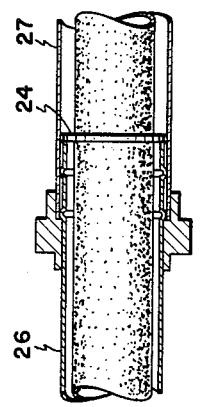
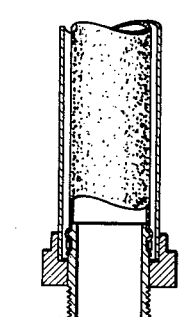
FIGURE V
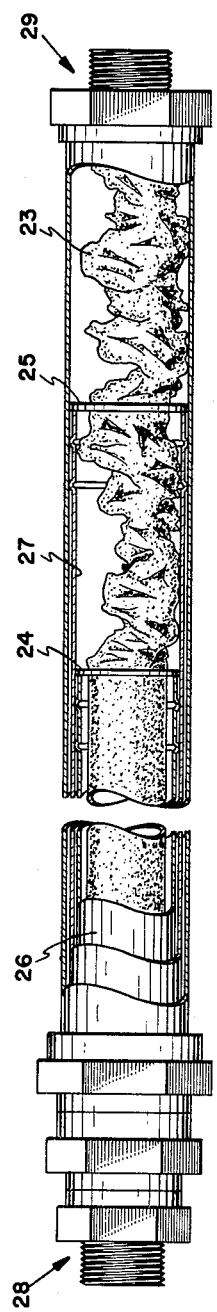
FIGURE VI
Logan L. Kennedy INVENTOR
BY *W.O. Heilman*
PATENT ATTORNEY

United States Patent Office 3,143,146
Patented Aug. 4, 1964

3,143,146
LEAKPROOF TELESCOPIC LOADING ARM
Logan L. Kennedy, Westfield, N.J., assignor to Esso Research and Engineering Company, a corporation of Delaware
Filed Jan. 2, 1962, Ser. No. 163,509
3 Claims. (Cl. 138—107)

This invention relates to an extensible loading arm. More particularly, this invention is concerned with a leakproof telescopic fluid loading arm.

Telescopic loading arms have long been used for transferring liquids, e.g., fuels and the like, from storage tanks to other containers. These loading arms being longitudinally extensible and contractible provide a versatile means of transferring liquids. However, these devices are prone to leak excessively. It is exceedingly difficult to obtain a sufficiently close fit between the sliding tubes to prevent leakage. This loss of product through leakage is costly. Moreover, the leakage of flammable or toxic liquids creates a hazard for persons working in the loading area. In addition to leaking excessively, these loading arms are easily attacked by corrosive fluids. This, of course, shortens the operational life of the device.

It is an object, therefore, of this invention to provide a telescopic type of liquid loading arm which is leakproof and corrosion resistant. It has been discovered that a flexible impermeable fluid conduit can be used in combination with a rigid telescopic tube or tubes to provide such a device. This device can provide (1) dollar savings by eliminating loss through leakage, (2) safety benefits through the elimination of leakage of flammable, toxic or otherwise dangerous or objectionable liquids, and (3) protection of the interior surface of the metallic sliding tube or pipe against corrosive liquids. These advantages are obtained without sacrificing versatility. This loading device can be used to transfer fluids from storage tanks to other containers, such as tank trucks, barges, barrels, etc. Since the device is telescopic in nature, the carrier, e.g., tank truck, need not be jockeyed to a specific position for loading.

This invention is best understood by referring to the accompanying drawings.

FIGURE I shows a partial cross-sectional view of the loading arm in the collapsed position.

FIGURE II shows a partial cross-sectional view of the loading arm in the extended position.

Both FIGURES I and II display a flexible pleated conduit longitudinally disposed within rigid sliding tubes.

FIGURE III displays another embodiment of the invention. A view of a flexible conduit supported by a number of telescopic tubes in the extended position is shown.

FIGURE IV shows a cross-sectional view of FIGURE III. This displays the ring device by which the flexible conduit is fastened to the supporting tubes.

FIGURE V shows a loading arm in the extended position.

FIGURE VI shows the loading arm of FIGURE V in the collapsed position.

The loading arm of this invention comprises a flexible fluid conduit and at least one rigid telescopic tube. The flexible conduit is made of an impermeable material which is not easily attacked by corrosive materials. For example, the conduit may be made of various rubbers or plastics. The rigid telescopic tube comprises one metallic tube sliding within another. It may, of course, comprise many tubes, each one sliding within the next larger tube.

In one embodiment of this invention, FIGURE I, the flexible conduit 1 is longitudinally disposed within a rigid telescopic tube. This rigid telescopic tube, as shown in FIGURE I, comprises two tubes 2 and 3, one sliding within the other. The flexible conduit 1 resembles a bellows in that it is accordion pleated. This pleated conduit extends and contracts in response to the position of the rigid telescopic tube. The flexible conduit is fastened to a pipe 4 with a clamp 5. An adhesive compound may be placed between the conduit and the pipe to ensure that leaking will not occur. The threaded pipe 4 is attached to a flange 6 which is fastened, e.g., with screws 7 to an adapter 8. The adapter 8 is fastened to tube 2. Tube 2 slides within tube 3. A stuffing box 9 is attached to the end of tube 3. The purpose of the stuffing box is best understood by reference to FIGURE III. The stuffing box prevents tube 2 from sliding out of tube 3.

FIGURE II shows the same embodiment as FIGURE I. However, in FIGURE II the loading arm is in the extended position. The components in FIGURE II are designated by the same numbers as the corresponding components in FIGURE I.

The end 10 of this loading arm can be coupled to storage tanks in various ways. One skilled in the art will be able to choose the coupling device best suited for the particular type of loading operation. An elbow or other suitable device can be attached to the other end 11 of the loading arm in order to facilitate the loading operation.

It is seen that the liquid being transferred through the loading arm of this invention is confined within the flexible fluid conduit. Therefore, the liquid can neither pass between tubes 2 and 3 nor corrode said tubes.

In another embodiment of this invention, FIGURE III, the flexible fluid conduit is not disposed within a rigid tube. Instead the conduit is supported by a number of rigid telescopic tubes 12 and 13. The flexible conduit 16 is clamped to a pipe 17. This threaded pipe can be welded to an adapter 18. The rigid telescopic supporting tubes 12 and 13 are also fastened to said adapter. Certain sections of the flexible pleated conduit 16 are smooth, i.e., unpleated in order to ensure a snug fit between the conduit and fastening rings 19 and 20. These fastening rings are attached, e.g., welded, to the rigid supporting tubes.

FIGURE IV displays a cross-sectional view of FIGURE III. This shows the fastening device. The rigid supporting tube 14 is not shown in FIGURE III so as not to clutter the drawing.

The flexible conduit extends and contracts in response to the position of the rigid telescopic supporting tubes. It is possible to properly support the conduit using only two tubes. However, it is preferred to employ four supporting telescopic tubes 12, 13, 14 and 15, as shown in FIGURE IV. One end 21 of this loading arm can be coupled to a storage tank. The other end 22 can be fitted with various devices which make the loading operation easier.

In the embodiments described hereinbefore, the flexible conduit is accordion pleated. Therefore, when a force is applied to the end of the conduit, said conduit will contract longitudinally but will not collapse. If the conduit collapsed, it might be pinched and ruptured by the sliding tubes.

In another embodiment of the instant invention a circumventially ribbed unpleated membranous conduit is employed rather than the pleated conduit of the embodiments described hereinbefore. This conduit can be made of various flexible impermeable materials, for example, rubbers and plastics. In this embodiment, FIGURE V, the flexible conduit 23 is circumventially ribbed. These ribs 24 and 25 can be attached to the ends of the inner sliding tubes 26 and 27. The ribs can be made of various materials, preferably metal. The fluid conduit 23 is disposed within the telescopic tube and can be attached to the threaded pipes 28 and 29, as described in the discussion of other embodiments of this invention.

FIGURE VI shows the loading arm of FIGURE V in the collapsed position. The pliable conduit 23 collapses randomly. The ribs 24 and 25 protect the randomly collapsed conduit from being pinched and ruptured by the sliding tubes.

In some instances it may be desirable to employ a pleated conduit in this embodiment of the invention. While ribs are not then necessarily needed to prevent the conduit from being pinched or ruptured, the ribs are desirable in that they guide the conduit and ensure that the conduit will longitudinally extend and contract smoothly.

It is not intended to restrict the present invention to the foregoing embodiments, but rather it should only be limited by the appended claims in which it is intended to claim all the novelty inherent in the invention.

What is claimed is:

1. A telescopic arm comprising in combination a rigid telescopic tube, a flexible impermeable liquid condit, said tube having conduit supporting means at spaced points in the upper portion thereof, said conduit being longitudinally disposed within and being attached to said supporting means in the rigid telescopic tube and collapsing and extending in response to the position of said telescopic tube.

2. The arm of claim 1 wherein said conduit is attached to the interior ends of the sliding tubes of the telescopic tube.

3. The arm of claim 1 wherein the fluid conduit is pleated.

References Cited in the file of this patent

UNITED STATES PATENTS

| | | |
|---|---|---|
| 202,042 | Miller | Apr. 2, 1878 |
| 268,860 | Browell | Dec. 12, 1882 |
| 982,482 | Donnelly | Jan. 24, 1911 |
| 1,078,640 | Pinczes | Nov. 18, 1913 |
| 1,211,067 | Braly | Jan. 2, 1917 |
| 1,475,289 | Diescher | Nov. 27, 1923 |
| 1,839,712 | Sturtz | Jan. 5, 1932 |
| 2,032,258 | Caton | Feb. 25, 1936 |
| 2,150,471 | Van Vulpen | Mar. 14, 1939 |
| 2,314,776 | Dittus et al. | Mar. 23, 1943 |
| 2,335,478 | Bergman | Nov. 30, 1943 |
| 2,565,296 | Chyle | Aug. 21, 1951 |
| 2,707,117 | Fentress et al. | Apr. 26, 1955 |
| 2,758,612 | Zaleski | Aug. 14, 1956 |
| 2,894,535 | Hansen | July 14, 1959 |
| 3,006,662 | Katsuhara | Oct. 31, 1961 |
| 3,026,807 | Hutchinson et al. | Mar. 27, 1962 |

FOREIGN PATENTS

| | | |
|---|---|---|
| 640,054 | France | Mar. 19, 1928 |
| 770,522 | France | July 2, 1934 |
| 826,523 | Germany | Jan. 3, 1952 |
| 87,094 | Denmark | Mar. 31, 1959 |